United States Patent
Permuy

(10) Patent No.: US 9,356,533 B2
(45) Date of Patent: May 31, 2016

(54) DRIVE TRAIN COMPRISING A DOUBLY-FED ELECTRIC MACHINE AND AN INVERTER CONTROLLED ACCORDING TO A LAW LIMITING THE DELIVERED ACTIVE POWER

(75) Inventor: Alfred Permuy, Rueil-Malmaison (FR)

(73) Assignee: GE Energy Power Conversion Technology, Warwickshire (GB)

( * ) Notice: Subject to any disclaimer, the term of this patent is extended or adjusted under 35 U.S.C. 154(b) by 291 days.

(21) Appl. No.: 14/009,547

(22) PCT Filed: Apr. 5, 2012

(86) PCT No.: PCT/EP2012/056364
§ 371 (c)(1),
(2), (4) Date: Oct. 3, 2013

(87) PCT Pub. No.: WO2012/136814
PCT Pub. Date: Oct. 11, 2012

(65) Prior Publication Data
US 2014/0022827 A1  Jan. 23, 2014

(30) Foreign Application Priority Data
Apr. 5, 2011  (FR) ...................................... 11 52938

(51) Int. Cl.
*H02P 1/54*   (2006.01)
*H02M 5/40*   (2006.01)
(Continued)

(52) U.S. Cl.
CPC .. *H02M 5/40* (2013.01); *H02J 3/38* (2013.01); *H02P 9/007* (2013.01); *F05B 2220/70646* (2013.01)

(58) Field of Classification Search
CPC ...................................................... H02M 5/40

USPC ...................................................... 318/34, 558
See application file for complete search history.

(56) References Cited

U.S. PATENT DOCUMENTS 7,423,412 B2 *  9/2008  Weng ...................... F03D 9/003
                                                        290/40 R
8,008,793 B2 *  8/2011  Andresen ........................ 290/44
(Continued)

FOREIGN PATENT DOCUMENTS

CN     101026301 A     8/2007
CN     101710716 A     5/2010
DE     102008009276    8/2009

OTHER PUBLICATIONS

Unofficial English Translation of Chinese Office Action issued in connection with corresponding CN Application No. 201280017289.7 on Apr. 3, 2015.
(Continued)

*Primary Examiner* — David S Luo
(74) *Attorney, Agent, or Firm* — Wood IP LLC; Theodore Wood; Deidre McAuley

(57) ABSTRACT

A drive train comprising an electric machine including a rotor and a stator, the stator being connected to an alternating grid and having a stator frequency, and a bidirectional system for converting an alternating current into another alternating current. The conversion system is connected between the grid and the rotor, and comprises an AC-DC converter connected to the grid, an inverter connected between the AC-DC converter and the rotor, and a device for controlling switches of the inverter according to a control law. The control law is such that the active power exchanged by the inverter with the rotor is essentially always lower than 0.3 times the nominal power of the direct current specifically circulating between the AC-DC converter and the inverter, for the frequencies of a target interval of between 0.6 times the stator frequency and 1.4 times the stator frequency.

20 Claims, 2 Drawing Sheets

(51) Int. Cl.
*H02J 3/38* (2006.01)
*H02P 9/00* (2006.01)

(56) References Cited

U.S. PATENT DOCUMENTS 8,310,074 B2 * 11/2012 Larsen .................... F03D 9/003
290/44
2010/0117605 A1 5/2010 Kretschmann

OTHER PUBLICATIONS

PCT International Search Report from corresponding PCT Application No. PCT/EP12/056364, dated Jul. 19, 2012.
Rahimi et al. "Grid-Fault ride-through analysis and control of wind turbines with doubly fed induction generators", Electric Power Systems Research, Elsevier, vol. 80, No. 2, Feb. 1, 2010, pp. 184-195.
Kasem et al. "A New Fault Ride-Through Strategy for Doubly Fed Wind-Power Induction Generators" Electrical Power Conference 2001, IEEE Canada, Oct. 25, 2007, pp. 1-7.

* cited by examiner

DRIVE TRAIN COMPRISING A DOUBLY-FED ELECTRIC MACHINE AND AN INVERTER CONTROLLED ACCORDING TO A LAW LIMITING THE DELIVERED ACTIVE POWER

CROSS-REFERENCE TO RELATED APPLICATIONS

This is a national stage application under 35 U.S.C. §371 (c) of prior-filed, co-pending, PCT application serial number PCT/EP2012/056364, filed on Apr. 5, 2012, which claims priority to French patent application serial number 1152938, filed on Apr. 5, 2011, the entire contents of which are incorporated by reference herein.

BACKGROUND OF THE INVENTION

1. Field of the Invention

Embodiments of the present invention relate to a drive train suitable for being connected to an AC electrical grid and comprising: an electric machine consisting of a rotor and a stator with the stator being electrically connected to the AC grid and having a stator frequency, a bidirectional conversion system of an AC electric current into another AC electric current, suitable for being connected between the AC grid and the rotor of the electric machine, with the bidirectional conversion system comprising: one bidirectional alternating current converter into direct current suitable for being connected to the alternating current grid, one bidirectional converter of direct current into alternating current connected between the AC-DC converter and the rotor, with the direct-alternating converter consisting of electronically controllable switches suitable for converting a direct voltage into an alternating voltage and of a connecting terminal with the rotor for each phase of the alternating voltage, and one control device of the switches of the direct-alternating converter being subject to a control law.

Embodiments of the present invention also relate to an electrical energy generation installation for an AC electrical grid, with the installation comprising a turbine and a similar drive train connected to the turbine, on the one hand, and suitable for being connected to the AC grid, on the other hand. Embodiments of the present invention are suitable for a wind turbine, or for a hydroelectric installation.

2. Description of Related Art

A drive train of the aforesaid type is known from the document "Grid connection of doubly fed induction generator wind turbines: a survey" of Martinez de Alegria & others. The drive train is connected to a three-phase grid and consists of a doubly-fed electric machine, with the stator of the machine being connected to the three-phase grid and the rotor being powered by means of a three-phase-three-phase converter connected to the three-phase grid. The converter consists of a rectifier connected to the three-phase grid and of an inverted rectifier connected between the rectifier and the rotor of the machine. In the event of a fault, such as a short circuit occurring on the three-phase grid, the drive train is obliged to conform to certain rules imposed by the electric grid (from English grid code), such as for example the German electrical grid or also the English electrical grid, in order to allow the grid to rectify this fault (from English Fault Ride Through-FRT).

This type of short circuit on the electrical grid involves a significant increase in the induced voltage at the rotor of the electric machine. The above-mentioned document then envisages different solutions in order to avoid a deterioration of the drive train, and in particular of the converter, as a result of this increase in induced voltage whilst still observing the rules of electrical grid in question.

Multiple solutions are envisaged such as the addition of a safety device against over-voltages and/or excess currents connected between the output terminals of the inverted rectifier on the AC side or even the addition of thyristors connected in anti-parallel between the electrical grid and the stator of the machine for each phase of alternating current. A solution is the addition of the safety device against over-voltages and/or excess currents combined with a rotor flow control system via a particular command from the converter that is connected between the rotor and the grid.

In any case, these different solutions necessitate the adding to the doubly-fed electric machine of an additional safety device, such as a device for protection against over-voltages and/or excess currents or thyristors connected in anti-parallel between the electrical grid and the stator of the machine.

BRIEF SUMMARY OF THE INVENTION

Embodiments of the present invention propose a drive train to be connected to an alternating electrical grid whilst observing the rules of this grid in the event of a fault on the grid such as a short-circuit, whilst not necessitating any kind of additional safety device.

In this respect, embodiments of the present invention provide a drive train of the above-mentioned type, characterized in that the control law is such that the active power exchanged by the DC-AC converter with the rotor is appreciably at all times lower than 0.3 times the nominal power of the direct current suitable for being circulated between the AC-DC converter and the DC-AC converter for the frequencies of an inclusive target interval between 0.6 times the stator frequency and 1.4 times the stator frequency. Following other production methods, the drive train includes one or several of the following characteristics, taken in isolation or following all of the technically possible combinations:

the control law is such that the active power exchanged by the direct-alternating converter is less than 0.2 times the aforesaid nominal power for the frequencies of the target interval;

the target interval is between 0.7 times the stator frequency and 1.3 times the stator frequency, or, in an embodiment, between 0.9 times the stator frequency and 1.1 times the stator frequency, or, in an embodiment, between 0.95 times the stator frequency and 1.05 times the stator frequency;

the drive train includes furthermore a first direct voltage measurement sensor between the alternating-direct converter and the direct-alternating converter, with a second sensor for recording the form of the wave of the alternating current at the terminals of the direct-alternating converter and the control device includes the means for actuating the aforesaid direct voltage for the frequencies of the target interval;

the means for actuating include a determination regulator of a correction of the aforesaid direct voltage and a band filter for selecting the waveform of the alternating current for the frequencies of the target interval, with the lower and higher frequencies of the band filter corresponding to the target interval;

the control law is such that the maximum amplitude of the alternating voltage at the terminals of the direct-alternating converter is, for the frequencies of the target interval, at all times appreciably lower than a pre-determined amplitude threshold, equal to 0.3 times the nominal voltage of the direct current between the alternating-direct converter and the direct-alternating converter, or, in an embodiment, equal to 0.2 times the aforesaid nominal voltage of the direct current;

the control law is such that the power factor of the alternating current at the terminals of the direct-alternating converter is appreciably at all times lower than 0.3 and, in an embodiment, lower than 0.2;

the direct-alternating converter is connected directly to the alternating-direct converter via a direct current circulation bus, in the absence of a braking chopper connected to the direct current circulation bus; and the direct-alternating converter is connected directly between the alternating-direct converter and the rotor, in the absence of a safety device against over-voltages and/or excess excess currents connected between the terminals of the direct-alternating converter.

Embodiment of the present invention also provide an electrical energy generation installation for an AC electrical grid, with the installation comprising a turbine and a similar drive train connected to the turbine, on the one hand, and suitable for being connected to the alternating grid, on the other hand, characterized in that the drive train is as defined here-above, with the electric machine being a generator connected to the turbine and the stator of the generator being suitable for being connected to the alternating grid.

BRIEF DESCRIPTION OF THE DRAWINGS

These characteristics and advantages of embodiments of the present invention will become apparent upon reading the description which follows, given solely by way of an example and made in reference to the attached drawing, on which.

DETAILED DESCRIPTION OF THE INVENTION

Figure 1:
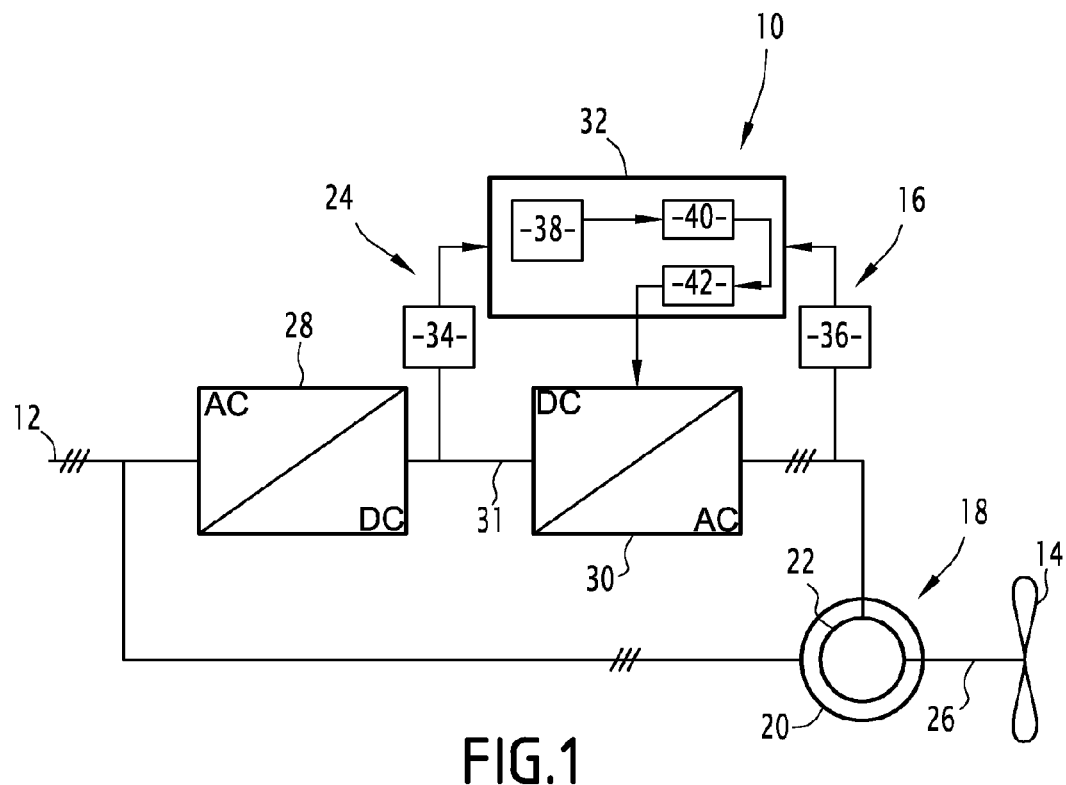
FIG. 1 is a schematic representation of an electrical energy generation installation including a drive train suitable for being connected to an alternating electrical grid according to an embodiment of the present invention.

On FIG. 1, an electrical energy generation installation 10 for an alternating electrical grid 12 comprises a turbine 14 and a drive train 16 connected to the turbine, on the one hand and is connected to the alternating grid, on the other hand.

The electrical energy generation installation 10 is, by way of an example, a wind turbine. In an embodiment, the electrical energy generation installation is a hydroelectric installation.

The alternating electrical grid 12 is, by way of an example, a three-phase grid appreciably equal to 50 Hz. By way of variation, the alternating frequency of the grid is appreciably equal to 60 Hz The electrical grid 12 has, by way of an example, a voltage of the order of 1 kV in the case of a wind turbine. By way of variation, the electrical grid has a voltage of the order of 33 kV in the case of a hydroelectric installation.

The alternating grid 12 is generally connected to a high voltage grid by means of a voltage transformer, which is not shown. The high-voltage grid has, by way of an example, a voltage of the order of 33 kV, in the case of a wind turbine. By way of a variation, the high-voltage grid has a voltage of the order of 100 kV in the case of a hydroelectric installation.

Each item of electrical equipment connected to the alternating grid 12 must evidence the rules of behavior in the event of a fault on the grid 12, such as a short-circuit, in order not to cause domino-effect faults on the grid 12. The rules of the German electrical grid require, as an example, that the electrical equipment should be capable of overcoming a fault on the grid (in English a Fault Ride Through—FRT) corresponding to a voltage drop to 15% of the nominal voltage for a period of 300 ms with a return to 80% of the nominal voltage after a period of 3 seconds. The rules of other electrical grids are similar to those of the German grid.

The drive train 16 includes an electric machine 18 comprising a stator 20 and a rotor 22, and a bidirectional conversion system 24 of alternating current into another alternating current, connected between the alternating grid 12 and the rotor 22 of the electric machine.

The electric machine 18 is an asynchronous machine. In the production example of FIG. 1, the electric machine 18 has a generator connected to the turbine 14.

The stator 20 is connected electrically to the alternating grid 12. The stator 20 has an angular speed stator current $w_{stator}$ and frequency $f_{stator}$, with the angular speed $w_{stator}$ being equal to $2\pi \times f_{stator}$. The frequency of the stator current, also called stator frequency $f_{stator}$ is equal to the frequency of the alternating current of the grid 12. The stator 20 is, by way of an example, connected directly to the alternating grid 12.

The rotor 22 is connected electrically to the conversion system 24. The rotor 22 comprises a shaft 26 mechanically integrated with a shaft of the turbine 14. The shaft 26 of the rotor has an angular speed $\mathrm{w}$ and a mechanical rotational frequency $f_{meca}$, with the angular speed $\mathrm{w}$ being equal to $2\pi \times f_{meca}$. A rotational pulsation current $\mathrm{w}_d$ rotor and a frequency $f_{rotor}$ is suitable for circulating within the rotor 22, with the rotational pulsation being equal to $\times f_{rotor}$. The rotor 22 has P pairs of magnetic poles.

The auto-piloting system relationship of the asynchronous machine 18 therefore verifies the following equation:

$$P \times w = W_{stator} - W_{rotor} \tag{1}$$

In other words, the stator frequency $f_{stator}$ and the rotational current frequency $f_{rotor}$, also called rotational frequency $f_{rotor}$, verify the following equation:

$$Px^1{}_{meca} = f_{stator} - f_{rotor} \tag{2}$$

By convention, the rotational frequency $f_{rotor}$ is positive when the flow of power through the conversion system 24 is directed from the alternating grid 12 to the electric machine 18, and is negative when the flow of power through the conversion system 24 is directed from the electric machine 18 to the alternating grid 12, with the conversion system 24 being bidirectional. When the rotational frequency $f_{rotor}$ is zero, no power flow passes through the conversion system 24, with the stator 20 being directly powered via the alternating grid 12 and the mechanical rotational frequency $f_{meca}$ being equal to the stator frequency $f_{stator}$.

In the case of a wind turbine, the value of the mechanical rotational frequency $f_{meca}$ multiplied by the number P of pairs of magnetic poles is between 60% and 140% of the value of the stator frequency $f_{stator}$, and, in an embodiment, between 70% and 130% of the value of the stator frequency $f_{stator}$. In other words, the value of the rotational frequency $f_{rotor}$ is between −40% and 40% of the value of the stator frequency $f_{stator}$, and, in an embodiment, between −30% and 30% of the value of the stator frequency $f_{stator}$.

In the case of a hydroelectric installation, the value of the rotational mechanical frequency $f_{meca}$ multiplied by the number P of pairs of magnetic poles is between 90% and 110% of the value of the stator frequency $f_{stator}$, and, in an embodiment, between 95% and 105% of the value of the stator frequency $f_{stator}$. In other words, the value of the rotational frequency $f_{rotor}$ is between −10% and 10% of the value of the stator frequency $f_{stator}$, and, in an embodiment, between −5% and 5% of the value of the stator frequency $f_{stator}$.

In the production example of FIG. 1, the stator frequency $f_{stator}$ is equal to 50 Hz and the mechanical rotational frequency $f_{meca}$ is of the order of 48/P Hz, so that the rotational frequency $f_{rotor}$ is of the order of 2 Hz.

The conversion system 24 includes a bidirectional converter of alternating current into direct current 28, also called an alternating-direct (AC-DC) converter, which is connected to the alternating grid, a bidirectional converter of direct current into alternating current 30 also called direct-alternating (AC-DC) converter, is connected between the alternating-direct converter and the rotor. The direct-alternating converter 30 includes electronically controllable switches suitable for converting a direct input voltage into an alternating output voltage and a connection terminal with the rotor 22 for each phase of the alternating voltage.

The person skilled in the art will understand that the bidirectional alternating direct converter 28 functions as a voltage rectifier and that the bidirectional direct-alternating converter 30 functions as an inverted voltage rectifier when the flow of power to the conversion system 24 is directed from the alternating grid 12 to the electric machine 18, that is to say when the rotational frequency $f_{rotor}$ is positive.

On the other hand, the person skilled in the art will understand that the bidirectional direct-alternating converter 30 functions as a voltage rectifier and that the bidirectional alternating-direct converter 28 functions as an inverted voltage rectifier when the flow of power through the conversion system 24 is directed from the electric machine 18 to the alternating grid 12, that is to say when the rotational frequency $f_{rotor}$ is negative.

The conversion system 24 also includes a direct current circulation bus 31 positioned between the alternating-direct converter and the direct-alternating converter and a device 32 for controlling the direct-alternating converter switches according to a control law.

Figure 2:
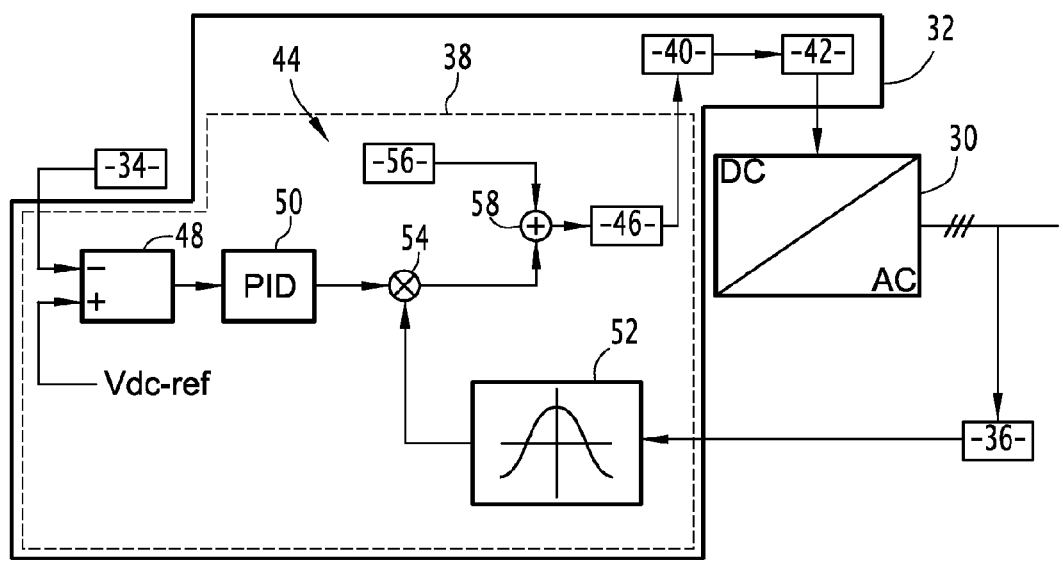
FIG. 2 is a schematic representation of a control device of switches of a direct-alternating converter of the drive train of FIG. 1, in accordance with a first production method according to an embodiment of the present invention.

In the production example of FIG. 2, the drive train 16 includes a first direct current measuring sensor suitable for circulation on the direct current bus 31 between the alternating-direct converter and the direct-alternating converter as well as a second sensor for recording the form of the wave of the alternating current at the terminals of the direct-alternating converter.

The alternating-direct converter 28 that can be seen on FIG. 1 includes an input terminal, not shown here, for each phase of the alternating current supplied by the grid 12 as well as two output terminals and an output mid-point, not shown here. The alternating-direct converter 28 is, by way of an example, a three-phase converter and therefore includes three input terminals.

The alternating-direct converter 28 has by way of an example a known topology of the neutral point clamped type, also called NPC topology (In English Neutral Point Clamped).

By way of variation, the alternating-direct converter 28 has a neutral point piloted type of topology, also called NPP topology (in English Neutral Point Piloted). The alternating-direct converter 28 comprises therefore, for each phase of the alternating current, two extreme branches and one intermediate branch also called a transversal branch. Each of the extreme branches is connected between a respective input terminal and the corresponding output and includes an electronically controllable switch. The intermediate branch is connected between a respective input terminal and the mid-point and comprises two switches connected in anti-series.

The direct-alternating converter 30 comprises two input terminals and an input mid-point, not shown here, as well as the terminals, not shown here, for connection with the rotor 22, with a connection terminal being specified for each alternating current phase. The bidirectional direct-alternating converter 30 includes electronically-controllable switches suitable for converting the direct current supplied by the alternating-direct converter 28 into an alternating current supplied to the rotor 22 when the rotational frequency is positive. On the other hand, when the rotational frequency is negative, the direct-alternating converter 30 is suitable for converting the alternating current supplied by the rotor 22 into a direct current supplied to the bidirectional alternating-direct converter 28 functioning therefore as an inverted rectifier.

The direct-alternating converter 30 is, by way of an example, a three level converter. The direct-alternating converter 30 is, by way of an example, a neutral point clamped converter, also called an NPC converter (Neutral Point Clamped). By way of variation, the director-alternating converter 30 is a converter piloted by the neutral, also called an NPP converter (Neutral Point Piloted).

In the production example of FIG. 1, the direct-alternating converter 30 is directly connected to the alternating-direct converter 28 via the direct current circulation bus 31 in the absence of a Dynamic Braking Chopper or DB Chopper, connected to the direct bus 31. The direct-alternating converter 30 is directly connected between the alternating-direct converter 28 and the rotor 22, in the absence of a safety device against over-voltages and/or excess currents (known as a crowbar in English) connected between the connection terminals at the rotor of the direct-alternating converter 30.

The direct current bus 31 has the direct voltage Vdc between the two output terminals of the alternating-direct converter 28, as well as between the two input terminals of the direct-alternating converter 30.

The command device 32 comprises a device 38 for calculating the control law of the direct-alternating converter switches, a device 40 determining the command signals of the direct-alternating converter switches as a function of the control law and a device 42 for applying the command signals to the switches of the direct-alternating converter 30.

The command device 32 comprises an information processing unit in the form of for example a data processor connected to a memory. The calculation device 38, the determination device 40 and the application device consist, by way of an example, respectively of a control or calculation software, a command signals determination software as a function of the control law and an application software of the command signals to the switches of the direct-alternating converter. The memory is suitable for storing the calculation software of the control law, for determining the command signals and the application of the command signals.

By way of variation, the calculation device 38, the determination device 40 and the application device 42 are produced in the form of dedicated programmable logic circuits. The calculation device 38 includes the first means 44 for calculating a command set-point and the second means 44 of calculating the control law as a function of the calculatedset-point.

The control law is such that the active power exchanged by the direct-alternating converter 30 with the rotor 22 is at all times appreciably lower than 0.3 times the nominal power of the direct current suitable for circulating between the alternating-direct converter 28 and the direct-alternating converter

30, for frequencies of a target interval of between 0.6 times the stator frequency $f_{stator}$ and 1.4 times the stator frequency $f_{stator}$.

The word "appreciably" means that the active exchanged power is, for the frequencies of the target interval, able to present a value that is greater 0.3 times the aforesaid nominal power, but only for a transitory period following the occurrence of a fault on the alternating grid 12. The transitory period is of a duration that is less than 30 ms and, in an embodiment, less than 20 ms.

In the case where the electrical energy generation installation 10 is a wind turbine, the target interval is, in an embodiment, between 0.7 times the stator frequency $f_{stator}$ and 1.3 times the $f_{stator}$.

In the case where the electrical energy generation installation 10 is a hydroelectric installation, the target interval is, by way of an example, between 0.9 times the stator frequency $f_{stator}$ and 1.1 times the stator frequency $f_{stator}$, and, in an embodiment, between 0.95 times the stator frequency $f_{stator}$ and 1.05 times the stator frequency $f_{stator}$.

The control law is such that the active power exchanged by the direct-alternating converter 30 is, by way of an example, less than 0.2 times the aforesaid nominal power for the frequencies of the target interval.

The nominal power of the direct current suitable for circulating on the direct current bus 31 is, for example, equal to several hundred kW, in the case of a wind turbine and several MWs in the case of a hydroelectric installation. The control law is such that the active power supplied by the direct-alternating converter 30 is therefore appreciably at all times lower than several tens of kW in the case of a wind turbine and several hundreds of KW in the case of a hydroelectric installation. The control law is such that the active power supplied by the direct-alternating converter is, for example, appreciably at all times below 50 kW in the case of a wind turbine and below 500 kW in the case of a hydroelectric installation.

The command device 32 includes the actuation means for the target interval frequencies of the direct voltage between the alternating-direct converter 28 and the direct-alternating converter 30. More precisely, the value of the active power exchange by the direct-alternating converter 30 is a function of the actuation, for the frequencies of the target interval, of the aforesaid direct voltage. The actuation of the aforesaid direct voltage is such that the active power exchanged by the direct-alternating converter 30 is, for the target interval frequencies, appreciably always of limited value and lower than 0.3 times the nominal power of the direct current suitable for circulating between the alternating-direct converter 28 and the direct-alternating converter 30.

In the production example of FIG. 2, the control law is such that the maximum amplitude of the alternating voltage at the terminals of the direct-alternating converter 30 is for the target interval frequencies, appreciably at all times lower than a pre-determined amplitude threshold. The pre-determined amplitude threshold is equal to 0.3 times the nominal voltage of the direct current between the alternating-direct converter 28 and the direct-alternating converter 30 and, in an embodiment, equal to 0.2 times the aforesaid voltage of the direct current.

The nominal voltage of the direct current suitable for circulating on the direct current bus 31 is, for example, equal to 1 kV, in the case of a wind turbine and 10 kV in the case of a hydroelectric installation. The pre-determined amplitude threshold is therefore equal to 300 V in the case of a wind turbine and 3 kV in the case of a hydroelectric installation. The pre-determined amplitude threshold is, in an embodiment, equal to 200 V in the case of a wind turbine and 2 kV in the case of a hydroelectric installation.

In the production example in FIG. 2, the first means of calculation 44 comprises a subtracter 48 connected to the first measurement sensor 34 on the one hand and suitable for receiving a predetermined Vdc-reference value of the direct voltage, on the other hand. The first means of calculation 44 also includes a regulator 50 connected to the output of the subtracter 48, a band-pass filter 52 that is connected to the second sensor 36 and a multiplier 54 connected to the outputs of the regulator 50 and of the filter 52. The first means of calculation 44 also includes the means 56 of determining the control set-point for the rotational frequency $f_{rotor}$ and an adding device 58 connected to the outputs of the multiplier 54 and of the means of determination 56.

The subtracter 48 is suitable for calculating the error between the direct voltage measured by the first sensor 34 and the pre-determined Vdc-ref. value.

The regulator 50 is, by way of an example, a proportional integral derivative regulator, also called a PID regulator. The regulator 50 is therefore suitable for determining a direct voltage correction as a function of the Vdc-ref. direct reference voltage.

The subtracter 48 and the regulator 54 form the means of the actuation of the voltage of the D.C. bus 31.

The band-pass filter 52 is suitable for selecting the waveform of the alternating current for a frequency band corresponding to the frequencies of the target interval and for attenuating the waveform for the frequencies outside of the frequency band. The frequency band of the band-pass filter 52 therefore has a lower cut-off frequency that is appreciably equal to the lower limit of the target interval and an upper cut-off frequency appreciably equal to the upper limit of the target interval. The band-pass filter 52 is, by way of an example a second-order filter. In other words, the lower frequency of the frequency band is equal to 0.6 times the stator frequency $f_{stator}$, and, in an embodiment, equal to 0.7 times the stator frequency $f_{stator}$ in the case of a wind turbine.

The lower frequency of the frequency band is equal to 0.9 times the stator frequency $f_{stator}$, and, in an embodiment, still equal to 0.95 times the stator frequency $f_{stator}$ in the case of a hydroelectric installation. The upper frequency of the frequency band is equal to 1.4 times the stator frequency $f_{stator}$ and, in an embodiment, equal to 1.3 times the stator frequency $f_{stator}$ in the case of a wind turbine. The upper frequency of the band of frequencies is equal to 1.1 times the stator frequency $f_{stator}$ and, in an embodiment, even equal to 1.05 times the stator frequency $f_{stator}$ in the case of a hydroelectric installation.

The multiplier 54 is suitable for multiplying the correction of voltage supplied by the regulator 50 with the waveform for the target interval frequencies coming from the band filter 52, in order to determine a control set-point for the frequencies of the target interval, with the alternating voltage amplitude at the direct-alternating converter terminals being selected as equaling the correction of the DC voltage for determining the control set-point.

The subtracter 48, the regulator 50, the band-pass filter 52 and the multiplier 54 therefore form the means of actuating the DC voltage for the frequencies of the target interval.

The adding device 58 is suitable for adding the command set-point for the frequencies of the target interval delivered by the multiplier 54 with the command set-point for the rotational frequency $f_{rotor}$ emanating from the means of determination 56, in order to determine the command set-point for the whole of the frequency spectrum that is provided to the second means of calculation 46.

The second means of calculation 46 are therefore suitable for calculating the control law of the direct-alternating converter 30 as a function of the order emanating from the adding device 58.

Thus, the control law of the direct-alternating converter 30 is such that the maximum amplitude of the alternating voltage at the direct-alternating converter terminals is, for the target interval frequencies, with regard to the stator frequency $f_{stator}$, appreciably at all times lower than the pre-determined amplitude threshold. More precisely the value of the maximum amplitude of the alternating voltage at the direct-alternating converter terminals 30 is a function of the actuation of the direct voltage of the DC bus 31 for the target interval frequencies. The actuation of the aforesaid direct voltage implies that the maximum amplitude of the alternating voltage at the direct-alternating converter terminals 30 is, for the frequencies of the target interval, appreciably always at a lower value than the pre-determined amplitude threshold. The term 'appreciably' means that the maximum amplitude of the aforesaid alternating voltage is, for the target interval frequencies, capable of having a higher value at the pre-determined threshold of amplitude, but only for a transitory period following the occurrence of a fault on the alternating grid 12. The transitory period is a duration lower than 30 ms, and, in an embodiment, lower than 20 ms, which is certainly less than the duration of the voltage drop to be overcome by the equipment in accordance with the grid rules, the latter being, for example, equal to 300 ms.

In particular, the occurrence of a short-circuit on the alternating grid 12 involves a significant increase in the induced voltage at the rotor 22 of the electric machine and the alternating voltage at the direct-alternating converter terminals 30 of the alternating side therefore increases for the frequencies in the neighbourhood of the stator frequency $f_{stator}$. The control law of the direct-alternating converter according to the invention therefore allows limiting of the DC voltage on the bus 31 when the alternating voltage increases for the target interval frequencies and by the actuation of the DC voltage for the target interval frequencies, whilst not altering the voltage values for the rotational frequency $f_{rotor}$ in order to retain the control of the rotor 22.

The drive train according to the invention therefore enables the avoidance of a deterioration of the conversion system 24 during the occurrence of a short circuit on the alternating grid 12 whilst observing the rules of the grid 12. Furthermore, the drive train does not necessitate the addition of a further device, such as a braking chopper connected to the circulation bus of the direct current 31 or any such safety device against over-voltages and/or the excess currents connected between the direct-alternating converter 30 of the alternating side FIG. 3 illustrates a second production method of the invention for which the similar elements to the first production method, described previously are to be found via the identical references and are not described again.

As per the second production method, the control law of the direct-alternating converter 30 is such that the cosφ of the alternating current at the direct-alternating converter terminals 30 is appreciably at all times lower than a pre-determined power factor threshold. The pre-determined power factor is equal to 0.3 and, in an embodiment, equal to 0.2. The word "appreciably" means that, for the frequencies of the target interval, the cosφ power factor can have a value that is greater than the pre-determined power factor threshold, but only has this during a transitory period following the occurrence of a fault on the alternating grid 12. The transitory period is of a duration that is less than 30 ms and, in an embodiment, less than 20 ms. In the production example shown in FIG. 3, the drive train 16 includes the first sensor 34 for measuring the DC voltage suitable for circulating on the DC bus 31 and the second sensor 36 for recording the waveform of the alternating current at the terminals of the direct-alternating converter 30.

Figure 3:
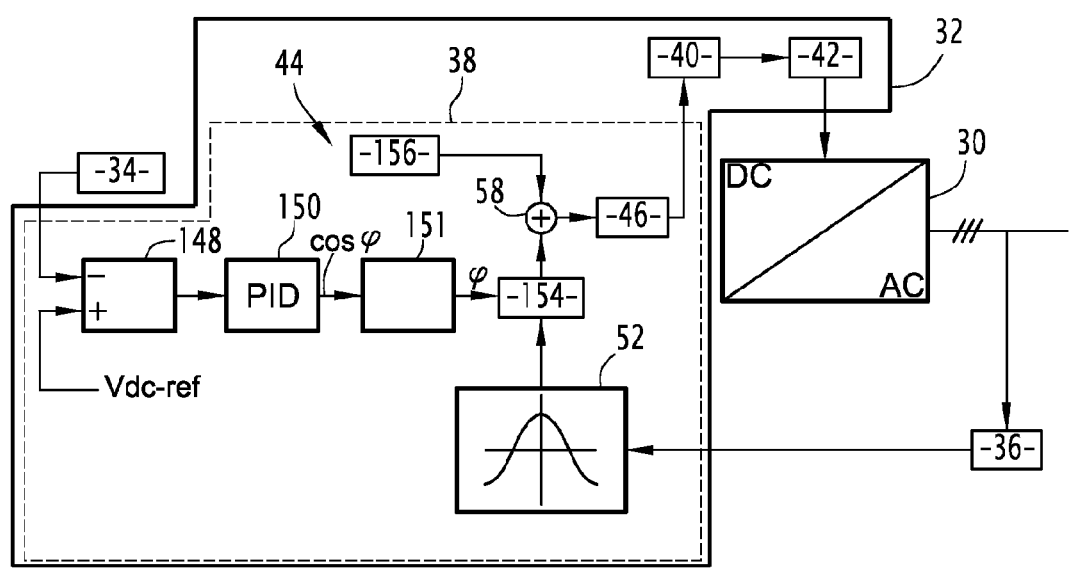
FIG. 3 is a similar view to that of FIG. 2 in accordance with a second production method of an embodiment of the present invention.

In the production example shown in FIG. 3, the first means of calculation 44 comprises a subtracter 148 connected to the first measurement sensor 34 on the one hand, and suitable for receiving the pre-determined Vdc-ref. reference value of the direct voltage. The first means of calculation 44 comprises a regulator 150 connected into the output of the subtracter 148, means 151 of determining a phase shift angle φ between the voltage and the alternating current intensity at the terminals of the direct-alternating converter 30, the means for determining the phase shift angle 151 being connected to the output of the regulator 150.

The first means of calculation 44 also includes the band-pass filter of 52 connected to the second sensor 36 and the first means 154 of determining the target interval frequencies of a command set-point as a function of the phase shift angle φ, with the first means of determination of the order 154 being connected to the outputs of the regulator 150 and of the filter 52.

The first means of calculation 44 also include the second means 156 of determining a command set-point as a function of the phase shift angle φ for the rotor frequency $f_{rotor}$ and an adding device 58 connected to the outputs of the first and second means of determining the order 154, 156.

The subtracter 148 is suitable for calculating the error between the direct voltage measured by the first sensor 34 and the pre-determined Vdc-ref reference value.

The regulator 150 is, by way of an example, a proportional integral derivative regulator, also called a PID regulator. The regulator 150 is suitable for determining a direct voltage correction as a function of the Vdc-ref. direct current reference voltage.

The subtracter 148 and the regulator 150 form the means of the actuation of the voltage of the DC bus 31.

The means for determining the phase shift angle 151 are suitable for determining the phase shift angle φ as a function of the correction of direct voltage emanating from the regulator 150 with the power factor cosφ of the alternating current at the terminals of the direct-alternating converter being selected as equal to the correction direct voltage for determining the set-point. The band-pass filter 52 is suitable for selecting the waveform of the alternating current for a frequency band corresponding to the frequencies of the target interval and for attenuating the waveform for the frequencies outside of the frequency band.

The band-pass filter 52 is identical to that of the first production method and is not therefore described again.

The first means of determining the order 154 suitable for determining the order for the target interval frequencies as a function of the phase shift angle φ and of the waveform for the target interval frequencies emanating from the band filter 52.

The subtracter 148, the regulator 150, the means of determining the phase shift angle 151, the band-pass filter 52 and the first means of determining the order 154 therefore form the means of actuating the direct voltage for the target interval frequencies.

The value of the power factor cosφ of the alternating current at the terminals of the direct-alternating converter 30 is a function of the actuation of the DC bus for the target interval frequencies. The actuation of the aforesaid direct voltage is such that the maximum value of the power factor cosφ is, for the target interval frequencies, appreciably always of low value at the pre-determined threshold of the power factor. The maximum value of the power factor cosφ can have a higher value at the pre-determined threshold of the power factor, only during a transitory period following the occurrence of a fault on the alternating grid 12. The transitory period of a duration lower than 30 ms, and, in an embodiment, lower than 20 ms is certainly less than the duration of the voltage drop to be overcome by the equipment in accordance with the grid rules, the latter being for example equal to 300 ms.

The adding device 58 is suitable for adding the order for the frequencies of the target interval delivered by the multiplier 154 with the order for the rotational frequency $f_{rotor}$ emanating from the second means of determination 146, in order to determine the command set-point for the whole of the frequency spectrum that is provided to the second means of calculation 46.

The second means 46 are therefore suitable for calculating the control law as a function of the step-point emanating from the adding device 58.

The functioning of this second production method is similar to that of the first production method. The control law of the direct-alternating converter is such that the power factor cosφ of the alternating current at the terminals of the direct-alternating converter 30 is appreciably at all times lower than 0.3, of a type that the active power exchanged by the direct-alternating converter 30 with the rotor is appreciably at all times less than 0.3 times the nominal power of the direct current on the DC bus 31.

The advantages of this second production method are identical to those of the first production method and not therefore described again.

It can therefore be understood that the drive train 16 in accordance with the invention designed to be connected to the alternating grid 12, enables the rules of the grid 12 to be observed in the case of a fault on the grid, such as a short-circuit, whilst at the same time not necessitating an additional safety device such as a braking chopper connected to the direct current circulation bus or some such safety device against over-voltages and/or excess currents connected to the terminals of the direct-alternating converter 30 of the alternating side.

The invention claimed is:

1. A drive train configured to be connected to an alternating electrical grid, the drive train comprising:
    an electric machine comprising a rotor and a stator, wherein the stator is configured to be electrically connected to the alternating grid and has a stator frequency; and
    a bidirectional conversion system of an alternating electrical current into another alternating electric current, configured to be connected between the alternating grid and the rotor of the electric machine, wherein the bidirectional conversion system comprises:
        a bidirectional alternating-direct converter converting alternating current into direct current configured to be connected to the alternating grid;
        a bidirectional direct-alternating converter converting direct current into alternating current connected between the alternating-direct converter and the rotor, wherein the direct-alternating converter comprises electronically controllable switches configured to convert a direct voltage into an alternating voltage, and a connecting terminal with the rotor for each phase of the alternating voltage;
        a first sensor configured to measure the direct voltage between the alternating-direct converter and the direct-alternating converter, and a second sensor configured to record the waveform of the alternating current at the terminals of the direct-alternating converter; and
        a control device configured to control the switches, wherein the active power exchanged by the direct-alternating converter with the rotor is less than the nominal power of the direct current for circulating between the alternating-direct converter and the direct-alternating converter for target interval frequencies.

2. The drive train according to claim 1, wherein the active power exchange by the direct-alternating converter with the rotor is lower than 0.2 times the nominal power for the target interval frequencies.

3. The drive train according to claim 2, wherein the target interval is between 0.7 times the stator frequency and 1.3 times the stator frequency.

4. The drive train according to claim 1, wherein a target interval is between 0.7 times the stator frequency and 1.3 times the stator frequency.

5. The drive train according to claim 1, wherein the control device comprises an actuator configured to actuate the direct voltage for the target interval frequencies.

6. The drive train according to claim 5, wherein the actuator comprises a determination regulator configured to correct the direct voltage, and a band-pass filter configured to select the waveform of the alternating current for the target interval frequencies, wherein the lower and higher frequencies of the band-pass filter frequencies of the band-pass filter corresponding to a target interval.

7. The drive train according to claim 1, wherein the maximum amplitude of the alternating voltage at the terminals of the direct-alternating converter is, for the target interval frequencies, appreciably at all time less than a pre-determined amplitude threshold equal to 0.3 times the nominal voltage of the direct current between the alternating-direct converter and the direct-alternating converter.

8. The drive train according to claim 1, wherein the power factor of the alternating current at the direct-alternating converter is appreciably at all time less than 0.3.

9. The drive train according to claim 1, wherein the direct-alternating converter is directly connected to the alternating-direct converter via a direct current circulation bus in the absence of a braking chopper connected to the direct current circulation bus.

10. The drive train according to claim 1, wherein the direct-alternating converter is directly connected between the alternating-direct converter and the rotor in the absence of a safety device against over-voltages and/or excess current connected between the terminals of the direct-alternating converter.

11. An electrical energy generation installation for use in an AC electrical grid, the installation comprising:
    a turbine; and
    a drive train connected to the turbine and configured to be connected to the AC electrical grid, the drive train comprising:
        an electric machine comprising a rotor and a stator, wherein the stator is configured to be electrically connected to the alternating grid and has a stator frequency; and
        a bidirectional conversion system of an alternating electrical current into another alternating electric current, configured to be connected between the alternating grid and the rotor of the electric machine, wherein the bidirectional conversion system comprises:
            a bidirectional alternating-direct converter converting alternating current into direct current configured to be connected to the alternating grid;

a bidirectional direct-alternating converter converting direct current into alternating current connected between the alternating-direct converter and the rotor, wherein the direct-alternating converter comprises electronically controllable switches configured to convert a direct voltage into an alternating voltage, and a connecting terminal with the rotor for each phase of the alternating voltage;

a first sensor configured to measure the direct voltage between the alternating-direct converter and the direct-alternating converter, and a second sensor configured to record the waveform of the alternating current at the terminals of the direct-alternating converter; and a control device configured to control the switches, wherein the active power exchanged by the direct-alternating converter with the rotor is less than the nominal power of the direct current suitable for circulating between the alternating-direct converter and the direct-alternating converter, for the target interval frequencies, wherein the electric machine is a generator connected to the turbine, and the stator of the generator is configured to be connected to the AC electrical grid.

12. The installation according to claim 11, wherein the active power exchange by the direct-alternating converter with the rotor is lower than 0.2 times the nominal power for the target interval frequencies.

13. The installation according to claim 12, wherein a target interval is between 0.7 times the stator frequency and 1.3 times the stator frequency.

14. The installation according to claim 11, wherein a target interval is between 0.7 times the stator frequency and 1.3 times the stator frequency.

15. The installation according to claim 11, wherein the control device comprises an actuator configured to actuate the direct voltage for the target interval frequencies.

16. The installation according to claim 15, wherein the actuator comprises a determination regulator configured to correct the direct voltage, and a band-pass filter configured to select the waveform of the alternating current for the target interval frequencies, wherein the lower and higher frequencies of the band-pass filter frequencies of the band-pass filter corresponding to a target interval.

17. The installation according to claim 11, wherein the maximum amplitude of the alternating voltage at the terminals of the direct-alternating converter is, for the target interval frequencies, appreciably at all time less than a pre-determined amplitude threshold equal to 0.3 times the nominal voltage of the direct current between the alternating-direct converter and the direct-alternating converter.

18. The installation according to claim 11, wherein the power factor of the alternating current at the direct-alternating converter is appreciably at all time less than 0.3.

19. The drive train according to claim 11, wherein the direct-alternating converter is directly connected to the alternating-direct converter via a direct current circulation bus in the absence of a braking chopper connected to the direct current circulation bus.

20. The drive train according to claim 11, wherein the direct-alternating converter is directly connected between the alternating-direct converter and the rotor in the absence of a safety device against over-voltages and/or excess current connected between the terminals of the direct-alternating converter.

* * * * *